(12) United States Patent
Shiozawa

(10) Patent No.: US 10,427,642 B2
(45) Date of Patent: Oct. 1, 2019

(54) METHOD FOR OPERATING AN IDENTIFICATION SYSTEM FOR A MOTOR VEHICLE

(71) Applicant: Robert Bosch GmbH, Stuttgart (DE)

(72) Inventor: Kazuki Shiozawa, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/868,263

(22) Filed: Jan. 11, 2018

(65) Prior Publication Data
US 2018/0208153 A1 Jul. 26, 2018

(30) Foreign Application Priority Data
Jan. 20, 2017 (DE) .................. 10 2017 200 919

(51) Int. Cl.
| | |
|---|---|
| *B60R 22/48* | (2006.01) |
| *B60Q 3/80* | (2017.01) |
| *G06K 9/00* | (2006.01) |
| *G06K 9/20* | (2006.01) |
| *G06K 9/62* | (2006.01) |
| *G06K 9/78* | (2006.01) |
| *B60Q 3/76* | (2017.01) |

(52) U.S. Cl.
CPC .............. *B60R 22/48* (2013.01); *B60Q 3/80* (2017.02); *G06K 9/00832* (2013.01); *G06K 9/2027* (2013.01); *G06K 9/6267* (2013.01); *G06K 9/78* (2013.01); *B60Q 3/76* (2017.02); *B60R 2022/4866* (2013.01)

(58) Field of Classification Search
CPC ............ B60R 22/48; B60R 2022/4806; B60R 2022/4866; B60Q 3/76; B60Q 3/80; G06K 9/00832; G06K 9/00838; G06K 9/2027
See application file for complete search history.

(56) References Cited

U.S. PATENT DOCUMENTS

| | | | |
|---|---|---|---|
| 2002/0003571 A1* | 1/2002 | Schofield ................ | B60C 23/00 348/148 |
| 2007/0002477 A1* | 1/2007 | Whitehead ................ | B60R 1/04 359/877 |
| 2007/0085669 A1* | 4/2007 | Becker .................... | B60R 22/48 340/457.1 |
| 2015/0077556 A1* | 3/2015 | Reed ...................... | H04N 7/183 348/148 |

FOREIGN PATENT DOCUMENTS

WO        98/48372 A1    10/1998

\* cited by examiner

*Primary Examiner* — Andrew W Bee
(74) *Attorney, Agent, or Firm* — Norton Rose Fulbright US LLP; Gerard Messina

(57) ABSTRACT

A method for operating an identification system for a motor vehicle for ascertaining and classifying an object in an interior space of the motor vehicle, the interior space being recorded with the aid of an interior camera and the interior space being illuminated during the recording with the aid of an illumination device, the method provides that an interior lighting system is activated as the illumination device. A corresponding system, a device, and a computer program for carrying out the method are also described.

11 Claims, 2 Drawing Sheets

METHOD FOR OPERATING AN IDENTIFICATION SYSTEM FOR A MOTOR VEHICLE

CROSS REFERENCE

The present application claims the benefit under 35 U.S.C. § 119 of German Patent Application No. DE 102017200919.5 filed on Jan. 20, 2017, which is expressly incorporated herein by reference in its entirety.

FIELD

The present invention relates to a method for operating an identification system for a motor vehicle for ascertaining and classifying an object in an interior space of the motor vehicle, the interior space being recorded with the aid of an interior camera and the interior space being illuminated during the recording with the aid of an illumination device. The present invention also relates to a corresponding system, a device, and a computer program for carrying out the method.

BACKGROUND INFORMATION

PCT Application No. WO 98/48372 describes a device for occupant detection in a vehicle, in which the occupant is detected with the aid of a camera and an additional illumination device being provided for the camera.

SUMMARY

An example method according to the present invention advantageously makes it possible to ascertain and classify objects with a low error rate and low costs. Refinements of the present invention are described herein.

The example method according to the present invention for operating an identification system for a motor vehicle for ascertaining and classifying an object in an interior space of the motor vehicle, the interior space being recorded with the aid of an interior camera and the interior space being illuminated during the recording with the aid of an illumination device, is characterized in that an interior lighting system is activated as the illumination device.

The objects to be ascertained and classified may be understood to mean, for example, an occupant of the vehicle (e.g., a driver, a passenger, or a person on the rear seat bench), a child seat and/or a child in a child seat, or a shopping bag or a purse on a seat. The interior space of the vehicle is illuminated in order to improve detection. This means, at least one portion of the interior space is illuminated, preferably the portion, of course, in which the object is expected, for example because the vehicle door has been opened and closed there. An illumination device is activated, i.e., utilized for this illumination. According to the present invention, an interior lighting system is used as the illumination device. An interior lighting system is an illumination device of the interior space, i.e., a lighting fixture or a lamp which is positioned in the interior space and is designed and positioned in such a way that it illuminates the interior space or a portion of the interior space. The controlled interior lighting system may advantageously include or be made up of lighting fixtures or light sources which are present anyway in the occupant compartment. This means, an interior lighting system is advantageously utilized, which is already present in the vehicle for performing the regular interior lighting function. The present lighting fixtures may be, for example, reading lights above the occupant seats, entry lights above the doors, light strips along the vehicle headliner, a flat light panel on the vehicle headliner, or illuminated decorative or accent strips in the area of the dashboard, the vehicle doors, or the A-, B- or C-pillars, or the like. The list is presented by way of example in this case and is not conclusive. The example method includes controlling light for a camera-based system in order to support the ascertainment and classification of objects, the system being utilized, in particular, in a motor vehicle. The support for the ascertainment and classification of the object in the interior space of the motor vehicle therefore takes place in that the interior space is illuminated with the aid of an interior lighting system.

The ascertainment and classification of the object are advantageously improved as a result. The detection proceeds more rapidly and is less susceptible to error. Since interior lighting systems are generally not based on infrared (IR), conventional disadvantages of IR illumination in the evaluation of camera images (for example, reflections, thermal radiation, harmful radiation for eyes, etc.) are largely avoided by way of the use of the interior lighting system. Due to the use of already present interior lighting systems, the need for a separate lighting system for the camera may be avoided. Costs as well as installation space are reduced as a result. The system may therefore be designed to be small and takes up little overall installation space.

In addition, the use of camera recordings including support from the interior lighting system is more accurate than weight sensors for ascertaining occupants. Weight sensors also do not allow for an accurate classification of a detected object. In addition, a large number of seat sensors may be substituted by the use of a camera.

In one advantageous specific embodiment, the method is characterized in provides that a lighting system, which emits light which is visible to an occupant, is activated as the illumination device.

This is understood to mean that the illumination device utilized for illumination includes a lighting system which emits light which is visible to the human eye. Previous lighting systems for interior cameras in a vehicle utilize IR light in particular, so that the driver and/or the occupant do/does not perceive the light. It is considered to be an advantage in this case that the driver and/or the occupant are/is not adversely affected when, for example, an illumination of his/her eye area takes place. Lighting systems also already exist in the vehicle, however, which explicitly emit visible light, for example in order to illuminate the interior space during entry and exit, in order to provide the occupant with better visibility. These interior lighting systems are activated, for example, when a door is opened before the user steps in. In addition, there is frequently also a so-called lag time, where the light is not deactivated immediately after the door is closed, but rather allowing for some additional time for the occupant who has entered to become oriented and/or to put on the seat belt and/or to adjust a comfort and/or entertainment system. Surprisingly, it has been found that a utilization of this illumination device is possible and suitable for an ascertainment and classification of objects in the interior space.

There is good acceptance by the user when this lag time of the present interior lighting system is appropriately utilized for carrying out such an ascertainment and classification. In some cases, the user does not even notice this additional function. In addition, the visible light does not cause a distraction or irritation, however, since the illumination takes place, in particular, at the beginning of a driving operation.

Advantageously, a function integration into existing interior lighting systems may thus take place. This means, the interior lighting systems are advantageously utilized for adjusting the brightness necessary for the camera. At the same time, additional illumination devices may be dispensed with. This results in fewer components, less required overall installation space, and lower costs for the system.

In one possible embodiment, the method is characterized provides that an interior lighting fixture on the front headliner and/or an interior lighting fixture on the rear headliner and/or a driver's reading light and/or a passenger's reading light are/is activated as the illumination device.

This is understood to mean that one or multiple interior lighting fixtures is/are utilized in order to achieve the desired illumination of the interior space. In addition to the aforementioned lamps, any other present or additional interior lighting fixtures may also be utilized, of course.

Advantageously, present lighting fixtures may be designed and/or positioned in such a way that they cover the desired additional functionality in the best possible way.

Due to the utilization of the existing components, no additional outlay or costs for further illumination devices is/are incurred. In addition, due to the utilization thereof, a suitable illumination is possible.

In one preferred embodiment, the method provides that an activation of the illumination device of the interior space takes place when a brightness in the interior space is insufficient.

This is understood to mean that illumination takes place only when the brightness in the interior space is insufficient for the desired ascertainment and classification with the aid of the camera. This means that, if a brightness is insufficient, an activation of the illumination device takes place in order to set the required brightness in the interior space and to allow for an ascertainment and classification. The required brightness may result from the requirements for the recording and/or for the evaluation of the camera images.

Advantageously, due to the conditional control and activation of the illumination device, unnecessary switching processes during the illumination are avoided. As a result, the component load may be reduced and the service life of the components, in particular of the lighting fixtures and the circuits, may be increased. In addition, the user acceptance may be advantageously increased as a result and an unnecessary distraction of the user may be avoided.

In one alternative refinement, the method is characterized provides that an illuminance of the illumination device is adapted as a function of an ascertained ambient brightness of the vehicle.

This is understood to mean that the brightness of the illumination device of the interior space is controlled as a function of the prevailing brightness of the vehicle surroundings. This means, the illuminance is adapted in accordance with the ambient brightness in order to achieve suitable illumination for the ascertainment and classification. The ascertainment of the ambient brightness takes place, for example, with the aid of sensors which are already installed (for automatic exterior light control, for example). A device is therefore provided, in which a control unit is connected to a sensor for determining an ambient brightness around the vehicle and/or in the vehicle and that the control unit is designed for controlling the brightness of the vehicle interior lighting system as a function of the determined ambient brightness.

It has been found that there is a mostly direct or indirect relationship between the ambient brightness and the interior brightness. Advantageously, present systems (ambient light sensors, for example) may be utilized in order to ascertain the ambient brightness. As a result, a sufficiently valid estimation may be achieved as to whether an activation of the interior lighting system is necessary for ascertaining and classifying objects. An activation and control of the illumination device takes place based on the values which were gathered in this way. This allows for a control with little outlay and low costs.

In one possible embodiment, the method provides that an activation of the illumination device of a subarea of the interior space takes place, in particular, as a function of which door was previously opened.

This is understood to mean that a selective illumination of the interior space takes place. This means that the entire interior space is not always completely illuminated, but rather that only the lighting system for one subarea of the interior space may be activated according to demand. For example, only an illumination of the passenger seat may take place, while the rear compartment is not illuminated. The selection and definition of the subarea to be illuminated may take place with consideration of whether an opening of a door to this subarea of the interior space was detected. This is based on the assumption that a person cannot be located in a defined subarea of the interior space if the corresponding access door has not been opened. For example, the passenger space is illuminated only if the passenger door has been opened. In addition, the rear compartment may be illuminated when one of the doors to the rear compartment has been opened, for example the left or the right rear door. In particular, the rear compartment is illuminated in its entirety, since, from experience, the seats are not necessarily occupied here only in accordance with the entry door which is utilized. As a result, an unnecessary activation of the illumination device may be advantageously avoided.

In one advantageous embodiment, the method provides that an illuminance of the illumination device is adapted as a function of an ascertained brightness in the interior space, in particular in that the illuminance of the illumination device is adapted in a subarea as a function of the ascertained brightness in the subarea of the interior space.

This is understood to mean that the brightness in the interior space or in a subarea of the interior space, such as the rear compartment, is ascertained. Additional or present brightness sensors may be provided in the interior space for this purpose. The control of the illumination device is varied based on the ascertained brightness in the interior space or in the subarea. This means that the lamps are controlled in accordance with the prevailing light conditions. This means that it is ascertained whether illumination is actually necessary. In addition, the illuminance necessary in order to achieve the required brightness may be ascertained. For example, if a rear compartment (the subarea of the rear seat bench) is dark, a high current is applied, so that a strong illumination of the rear compartment takes place. In addition, if a passenger space is somewhat illuminated at the same time, only a medium current may be applied, so that a medium illumination of the passenger space takes place.

In this way, an optimal activation of the interior lighting system may advantageously take place according to demand. No activation may take place, of course, when the existing brightness is sufficient for a valid ascertainment and classification with the aid of the interior camera.

In one preferred refinement, the method provides that a restraint system is activated as a function of the results of the ascertainment and classification of the object; and/or a seat belt warning signal is output as a function of the results of the ascertainment and classification of the object and as a function of an ascertainment that a seat belt has not been put on.

This is understood to mean that the results yielded by the ascertainment and classification of objects are utilized for a control of further components or devices. This means, the gathered data are directly or indirectly taken into account for further processes and actions. For example, a signal for a safety device is output and/or a direct control of a safety system takes place. In addition, an adjustment of a safety device may take place on the basis of the gathered data. An automatic airbag shutoff when a child seat is detected should be mentioned by way of example.

Advantageously, a high level of quality in the ascertainment of results may be achieved by way of the described method. This likewise allows for a high degree of validity for a control and/or activation of further systems on the basis of the gathered information.

In one preferred embodiment, the method provides that a shutoff of the illumination device, in particular in a subarea of the interior space, takes place as a function of a vehicle door having been closed; and/or
no occupant having been identified; and/or
it having been ascertained that an identified occupant has put on a seat belt; and/or
it having been ascertained that all the identified occupants on the rear seat bench have put on a seat belt; and/or
a seat belt warning signal having been terminated.

In this case, a seat belt warning signal is understood to be a warning for the occupants to put on a seat belt. The described activation, control and, therefore, also the shutoff of the illumination device or illumination devices are therefore to be understood to mean that these may also relate to a subarea of the interior space. This means, a shutoff of the illumination device in a subarea of the interior space takes place as a function of a vehicle door to the particular subarea having been closed, of no occupant having been identified in the particular subarea, or as a function of it having been ascertained that an occupant identified in the subarea has put on a seat belt. For example, the light in the passenger space shuts off when the passenger has put on the seat belt. Or, the light in the rear compartment shuts off when it is ascertained that all identified occupants on the rear seat bench have put on their seat belts.

As a result, a premature shutoff and insufficient illumination during the ascertainment and classification may be advantageously avoided. A prompt shutoff, which takes place as soon as results are available at the required level of quality, is simultaneously made possible. This results in an increase in user acceptance, since a timely shutoff of the interior lighting system takes place, and this results in an increase in the quality of the ascertained results, since the illumination is available for a sufficiently long period of time.

In addition, a system for a motor vehicle is provided for ascertaining and classifying an object in an interior space of the motor vehicle, the system including an interior camera for recording the interior space and an illumination device for illuminating the interior space during the recording. The system provides, according to the present invention, that an interior lighting system, as the illumination device, is designed for ascertaining and classifying the object.

In addition, a device is provided, which is configured for carrying out the described method.

This is understood to mean that the device is designed for carrying out the described method when used as intended. For example, a device is provided, which is configured for carrying out a method for operating an identification system for a motor vehicle for ascertaining and classifying an object in an interior space of the motor vehicle, the interior space being recorded with the aid of an interior camera and the interior space being illuminated with the aid of an illumination device during the recording, an interior lighting system being utilized and/or activated as the illumination device. The device is to be considered to be, for example, a control unit for controlling the illumination device and/or a control unit for controlling the identification system and/or an interior camera for ascertaining and classifying an object and/or interior lighting systems.

According to the present invention, a computer program is also provided, which is configured for carrying out the described method, and a machine-readable memory medium is provided, on which the computer program is stored.

BRIEF DESCRIPTION OF THE DRAWINGS

It should be noted that the features described individually in the description may be combined with each other in an arbitrary technically meaningful way and show further embodiments of the present invention. Further features and advantages of the present invention result from the description of exemplary embodiments with reference to the figures.

DETAILED DESCRIPTION OF EXAMPLE EMBODIMENTS

Figure 1:
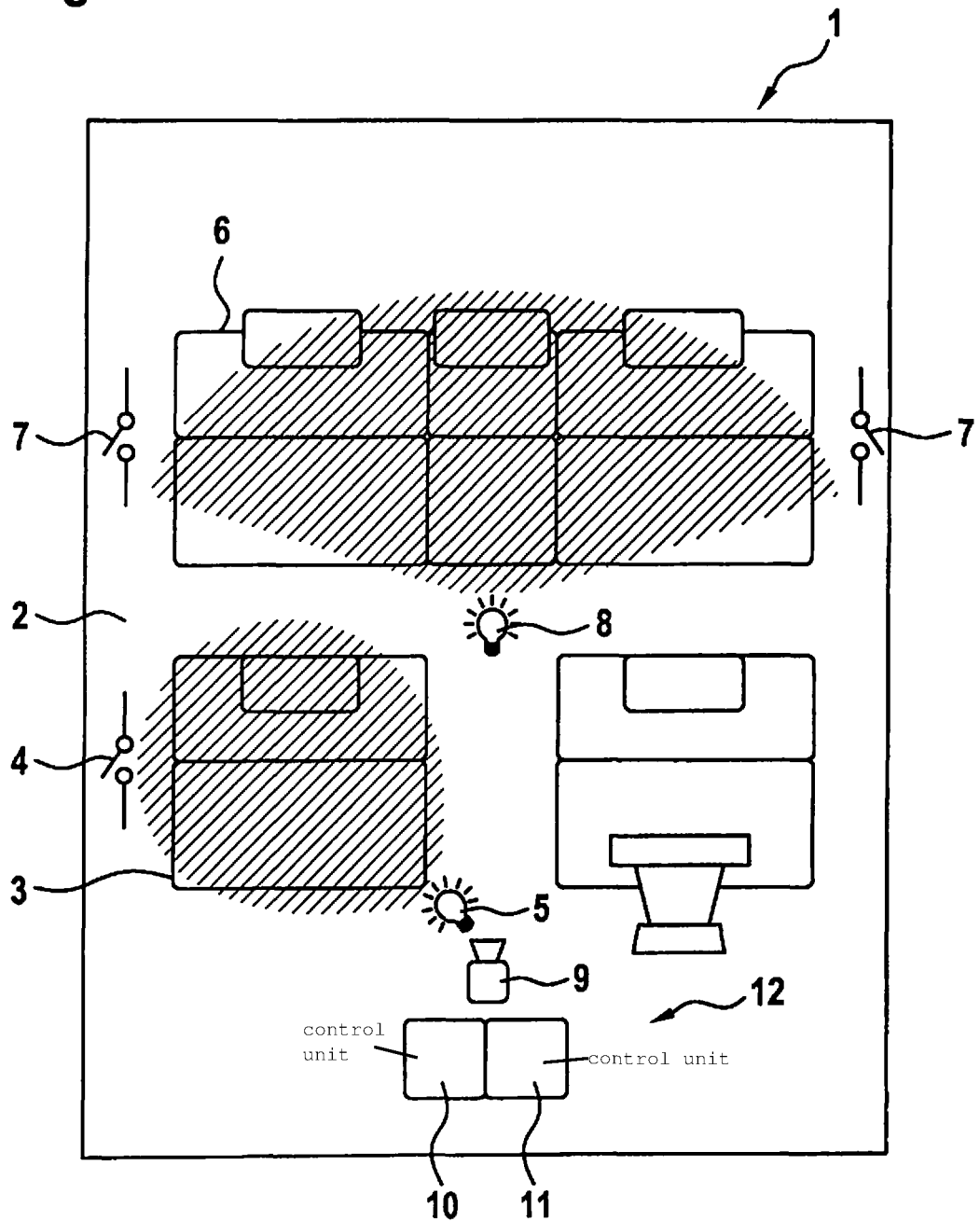
FIG. 1 shows a schematic representation of a motor vehicle including illumination of the passenger seat and of the rear seat bench with the aid of interior lighting systems.

FIG. 1 shows a schematic representation of a motor vehicle 1 including illumination of passenger seat 3 and of rear seat bench 6 with the aid of interior lighting systems. Interior space 2 of a motor vehicle 1 designed as a passenger car is represented in this case. Located in interior space 2 is a driver's seat, next thereto a passenger seat 3, and a rear seat bench 6 in the rear compartment of motor vehicle 1. An illumination device 5 for passenger seat 3 and an illumination device 8 for rear seat bench 6 are also represented. In this case, illumination device 5 is designed and positioned in such a way that it illuminates passenger seat 3 as well as the subarea of interior space 2 which surrounds passenger seat 3. In this case, illumination device 8 of rear seat bench 6 is designed and positioned in such a way that it illuminates rear seat bench 6 as well as the subarea of interior space 2 which surrounds rear seat bench 6. An interior camera 9 is also provided. An ascertainment and classification of the objects—in particular the occupants—in interior space 2 or at least in a subarea of interior space 2 takes place with the aid of this camera 9. The illumination of the particular subarea is utilized for supporting and optimizing the ascertainment and classification of the objects with the aid of interior camera 9. Interior camera 9 itself therefore does not require a separate illumination device. The control of illumination device 5 and 8 takes place with the aid of a control unit 10. A control unit 11 may also be provided for identification system 12. The classification of the objects on the basis of the gathered data from interior camera 9 may take place with the aid of this control unit 11. The doors of motor vehicle 1 are not explicitly represented, although an opening switch 4 of the passenger door and an opening switch 7 of the left and the right rear compartment doors are indicated. In this case, it may be provided that illumination device 5 and 8 is activated only when it is detected with the aid of opening switch 4 and 7 that the passenger door, or at least one of the doors of the rear compartment, has been opened. Represented identification system 12 therefore includes control unit 10 for the light, control unit 11 for the identification system, and interior camera 9.

Figure 2:
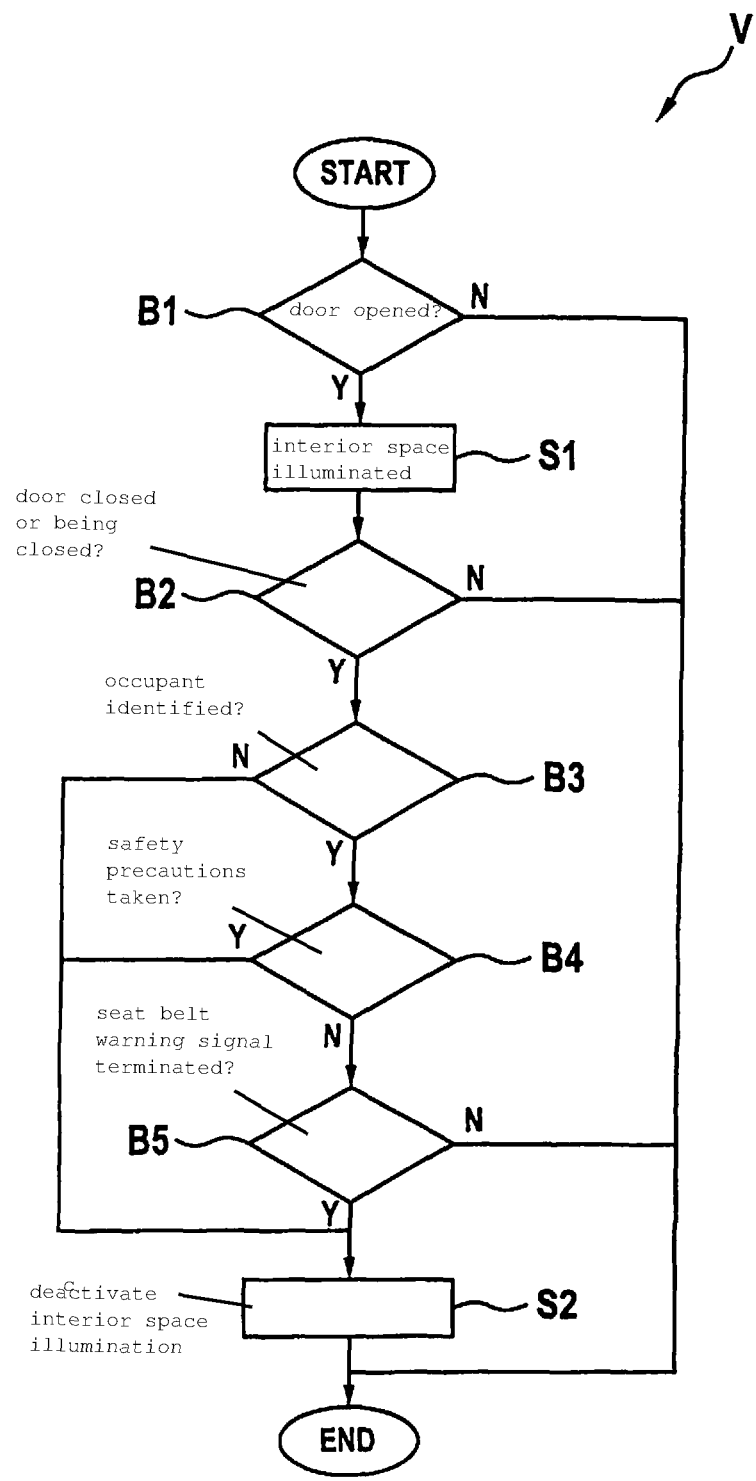
FIG. 2 shows a schematic representation of the method according to one exemplary specific embodiment of the present invention.

FIG. 2 shows a schematic representation of method V according to one exemplary specific embodiment of the present invention. The method for ascertainment and classification starts, for example automatedly during a start of the vehicle, as soon as the ignition is activated. The method may also be manually activated, of course, or may be started at a different point in time during the operation of the vehicle. Alternatively, it is also possible that the method starts as soon as, for example, a deactivation of the locking system takes place, for example if the vehicle is opened by the driver with the aid of a radio key. After a start of the method, the fulfillment of a first condition B1 is checked. Condition B1 ascertains whether a (specific, in particular) door has been opened. If this is not the case (B1=N), for example for a defined period of time, the method is terminated. However, if a door being opened has been identified (B1=Y), the interior lighting system is activated and the interior space is illuminated in a first method step S1. In this case, it may be provided that only the interior lighting system is activated, which is assigned to the particular door which has been opened. Therefore, only the subarea of the interior space is illuminated. For example, the passenger door being opened exclusively results in an illumination of the subarea of the interior space around the passenger seat. However, even one of the doors of the rear compartment (i.e., the left or the right door of the rear seat bench) being opened may result in an illumination of the entire subarea of the rear seat bench. Subsequent thereto, a second condition B2 is checked. Condition B2 ascertains whether the door is closed or whether the open door is being closed. If condition B2 is not met within a defined period of time (B2=N), the method is terminated. If condition B2 is met (B2=Y), however, the method is continued. Subsequent thereto, a third condition B3 is checked. Condition B3 ascertains whether an occupant may be identified. If condition B3 is not met within a defined period of time (B3=N), the interior lighting system is deactivated in a further method step S2. If condition B3 is met (B3=Y), however, the method is continued. Subsequent thereto, a fourth condition B4 is checked. Condition B4 ascertains whether a seat belt has been put on. This means that a check is carried out to determine whether the identified occupant of the vehicle has properly put on a required seat belt. Alternatively, further or additional embodiments of condition B4 may be present, of course, for example it may be checked whether any other required safety precautions have been taken by the driver. If condition B4 is met (B4=Y), the interior lighting system is deactivated in a further method step S2. If condition B4 is not met within a defined period of time (B4=N), however, the method is continued. An unmet condition may be present when the required situation is not actually present (for example, the passenger has not put on a seat belt) or when it may not be detected with the aid of the system that the required situation is present (for example, the passenger has put on the seat belt, but this is erroneously not detected).

When the method is continued, a fifth condition B5 is subsequently checked. Condition B5 ascertains whether a seat belt warning signal has been terminated. If condition B5 is met (B5=Y), the interior lighting system is deactivated in a further method step S2. If condition B5 is not met within a defined period of time (B5=N), however, the method is terminated. After further method step S2 is carried out, i.e., after deactivation of the interior lighting system, the method is likewise terminated.

What is claimed is:

1. A method for operating an identification system for a motor vehicle for ascertaining and classifying an object in an interior space of the motor vehicle, the method comprising:
   recording the interior space with the aid of an interior camera; and
   illuminating the interior space during the recording with the aid of an illumination device, wherein an interior lighting system of the motor vehicle is activated as the illumination device, wherein a lighting fixture, which emits light visible to an occupant, is activated as the illumination device, wherein:
   the interior space is divided into a plurality of subareas,
   the illumination device includes a plurality of illumination elements, each illuminating element being assigned to only a respective one of the plurality of subareas, and each illuminating element being assigned to a corresponding one of a plurality of vehicle doors, and
   in response to one of the vehicle doors being ajar, only the illumination element assigned to the ajar vehicle door is selectively activated to illuminate only the assigned one of the plurality of subareas.

2. The method as recited in claim 1, wherein the lighting fixture includes at least one of: (i) an interior lighting fixture on a front headliner of the motor vehicle, (ii) an interior lighting fixture on a rear headliner of the motor vehicle, (iii) a driver's reading light of the motor vehicle, and (iv) a passenger's reading light of the motor vehicle.

3. The method as recited in claim 1, wherein an activation of the illumination device of the interior space takes place when a brightness in the interior space is insufficient.

4. The method as recited in claim 1, wherein an illuminance of the illumination device is adapted as a function of an ascertained ambient brightness of the vehicle.

5. The method as recited in claim 1, wherein an activation of the illumination device of a subarea of the interior space takes place as a function of which door was previously opened.

6. The method as recited in claim 1, wherein an illuminance of the illumination device is adapted as a function of an ascertained brightness in the interior space, the illuminance of the illumination device is adapted in a subarea of the interior space as a function of the ascertained brightness in the subarea of the interior space.

7. The method as recited in claim 1, further comprising at least one of:
   activating a restraint system as a function of the results of the ascertainment and classification of the object; and
   outputting a seat belt warning signal as a function of the results of the ascertainment and classification of the object and as a function of an ascertainment that a seat belt has not been put on.

8. The method as recited in claim 1, wherein a shutoff of the illumination device in a subarea of the interior space takes place as a function of at least one of:
   (i) a vehicle door having been closed;
   (ii) no occupant having been identified;

(iii) it having been ascertained that an identified occupant has put on a seat belt;
(iv) it having been ascertained that all identified occupants on the rear seat bench have put on a seat belt; and
(v) a seat belt warning signal having been terminated.

9. A system for a motor vehicle for ascertaining and classifying an object in an interior space of the motor vehicle, the system comprising:
an interior camera for recording the interior space; and
an illumination device for illuminating the interior space during the recording, wherein an interior lighting system is the illumination device for ascertaining and classifying the object, wherein a lighting fixture, which emits light visible to an occupant, is activated as the illumination device, wherein:
the interior space is divided into a plurality of subareas,
the illumination device includes a plurality of illumination elements, each illuminating element being assigned to only a respective one of the plurality of subareas, and each illuminating element being assigned to a corresponding one of a plurality of vehicle doors, and
in response to one of the vehicle doors being ajar, only the illumination element assigned to the ajar vehicle door is selectively activated to illuminate only the assigned one of the plurality of subareas.

10. A device for operating an identification system for a motor vehicle for ascertaining and classifying an object in an interior space of the motor vehicle, the device designed to:
record the interior space with the aid of an interior camera; and
illuminate the interior space during the recording with the aid of an illumination device, wherein an interior lighting system of the motor vehicle is activated as the illumination device, wherein a lighting fixture, which emits light visible to an occupant, is activated as the illumination device, wherein:
the interior space is divided into a plurality of subareas,
the illumination device includes a plurality of illumination elements, each illuminating element being assigned to only a respective one of the plurality of subareas, and each illuminating element being assigned to a corresponding one of a plurality of vehicle doors, and
in response to one of the vehicle doors being ajar, only the illumination element assigned to the ajar vehicle door is selectively activated to illuminate only the assigned one of the plurality of subareas.

11. A non-transitory machine-readable memory medium on which is stored a computer program for operating an identification system for a motor vehicle for ascertaining and classifying an object in an interior space of the motor vehicle, the computer program, when executed by a processor, causing the processor to perform:
recording the interior space with the aid of an interior camera; and
illuminating the interior space during the recording with the aid of an illumination device, wherein an interior lighting system of the motor vehicle is activated as the illumination device, wherein a lighting fixture, which emits light visible to an occupant, is activated as the illumination device, wherein:
the interior space is divided into a plurality of subareas,
the illumination device includes a plurality of illumination elements, each illuminating element being assigned to only a respective one of the plurality of subareas, and each illuminating element being assigned to a corresponding one of a plurality of vehicle doors, and
in response to one of the vehicle doors being ajar, only the illumination element assigned to the ajar vehicle door is selectively activated to illuminate only the assigned one of the plurality of subareas.

* * * * *